United States Patent
Xie

(10) Patent No.: US 11,893,822 B2
(45) Date of Patent: Feb. 6, 2024

(54) TERMINAL DEVICE

(71) Applicant: ViVO MOBILE COMMUNICATION CO., LTD., Chang'an Dongguan (CN)

(72) Inventor: Xiang Xie, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 203 days.

(21) Appl. No.: 17/390,478

(22) Filed: Jul. 30, 2021

(65) Prior Publication Data

US 2021/0357614 A1    Nov. 18, 2021

Related U.S. Application Data

(63) Continuation of application No. PCT/CN2020/073194, filed on Jan. 20, 2020.

(30) Foreign Application Priority Data

Jan. 31, 2019  (CN) .................... 201910098786.8

(51) Int. Cl.
*G06V 40/13*    (2022.01)
*F21V 8/00*    (2006.01)

(52) U.S. Cl.
CPC ....... *G06V 40/1318* (2022.01); *G02B 6/0051* (2013.01); *G02B 6/0053* (2013.01); *G06V 40/1324* (2022.01)

(58) Field of Classification Search
None
See application file for complete search history.

(56) References Cited

U.S. PATENT DOCUMENTS

| | | |
|---|---|---|
| 2015/0364107 A1 | 12/2015 | Sakariya et al. |
| 2016/0202408 A1 | 7/2016 | Wang |

(Continued)

FOREIGN PATENT DOCUMENTS

| | | |
|---|---|---|
| CN | 106547408 A | 3/2017 |
| CN | 107590421 A | 1/2018 |

(Continued)

OTHER PUBLICATIONS

Indian Office Action related to Application No. 202127038897; reported on Mar. 9, 2022.

(Continued)

*Primary Examiner* — Joseph R Haley
(74) *Attorney, Agent, or Firm* — von Briesen & Roper, s.c.

(57) ABSTRACT

A terminal device is disclosed, including a display module, an optical fingerprint sensor, at least two backlight assemblies, and a light emitter. The display module includes a display screen and a light-transmissive cover that covers the display screen. The light emitter and the display screen are both fastened onto an inner surface of the light-transmissive cover, the optical fingerprint sensor is provided on a side of the display screen facing away from the light-transmissive cover, and the at least two backlight assemblies are provided sequentially between the display screen and the optical fingerprint sensor. Along a direction from the display screen to the optical fingerprint sensor, areas of light-transmissive regions of the at least two backlight assemblies are gradually reduced. Light emitted by the light emitter experiences a finger, and then successively passes through the display module and the light-transmissive regions and is projected onto the optical fingerprint sensor.

19 Claims, 3 Drawing Sheets

(56) References Cited

U.S. PATENT DOCUMENTS

| | | | |
|---|---|---|---|
| 2018/0204040 A1 | 7/2018 | Kwon et al. | |
| 2019/0026527 A1* | 1/2019 | He et al. | |
| 2020/0073447 A1* | 3/2020 | Zhang | G06V 10/17 |
| 2020/0117877 A1 | 4/2020 | Xle | |
| 2020/0127066 A1* | 4/2020 | Zhang | H01L 31/173 |

FOREIGN PATENT DOCUMENTS

| | | |
|---|---|---|
| CN | 108446677 A | 8/2018 |
| CN | 207780668 | 8/2018 |
| CN | 208173153 U | 11/2018 |
| CN | 109061946 A | 12/2018 |
| CN | 109196522 A | 1/2019 |
| CN | 109784307 A | 5/2019 |
| JP | 2016130840 A | 7/2016 |
| KR | 20110001444 A | 1/2011 |
| KR | 20180083700 A | 7/2018 |
| WO | 2017206676 A1 | 12/2017 |
| WO | 2018014629 A1 | 1/2018 |

OTHER PUBLICATIONS

Extended European Report related to Application No. 20749287.7; reported on Mar. 3, 2022.
Japanese Office Action for related Application No. 2021-544667; reported on Nov. 14, 2022,.
International Search Report & Written Opinion related to Application No. PCT/CN2020/073194; reported on Aug. 12, 2021.
South Korean Request for the Submission of an Opinion for related Application No. 10-2021-7027449; reported on Aug. 21, 2023,.

* cited by examiner

US 11,893,822 B2

TERMINAL DEVICE

CROSS-REFERENCE TO RELATED APPLICATIONS

The present application is a continuation application of PCT Application No. PCT/CN2020/073194 filed on Jan. 20, 2020, which claims a priority of the Chinese patent application No. 201910098786.8 filed on Jan. 31, 2019, which are incorporated herein by reference in their entirety.

TECHNICAL FIELD

This disclosure relates to the field of communications device technologies, and in particular, to a terminal device.

BACKGROUND

With increasing user demands, functions of terminal devices have been significantly developed. For user security, current terminal devices are generally equipped with fingerprint recognition modules. The fingerprint recognition modules not only improve security performance of the terminal devices, but also facilitate use by users. For example, the user performs payment confirmation and other operations by using the fingerprint recognition module.

An optical fingerprint recognition module is a commonly used recognition module. For ease of use, a current optical fingerprint recognition module is typically disposed in a region covered by a display screen of the terminal device, and a finger placement region for the user is provided on the display screen. In general cases, backlight assemblies need to be provided for some display screens used in the terminal devices. In order to ensure that the optical fingerprint recognition module can perform optical recognition, a light-transmissive region needs to be provided in the backlight assembly. The light-transmissive region typically has a relatively large area to ensure that enough light is projected into the optical fingerprint recognition module to be sensed. However, the light-transmissive region with a larger area may affect backlight effect of the backlight assembly.

SUMMARY

A terminal device is provided and includes a display module, an optical fingerprint sensor, at least two backlight assemblies, and a light emitter. The display module includes a display screen and a light-transmissive cover that covers the display screen. The light emitter and the display screen are both fastened onto an inner surface of the light-transmissive cover, the optical fingerprint sensor is provided on a side of the display screen facing away from the light-transmissive cover, and the at least two backlight assemblies are provided sequentially between the display screen and the optical fingerprint sensor. Along a direction from the display screen to the optical fingerprint sensor, areas of light-transmissive regions of the at least two backlight assemblies are gradually reduced. Light emitted by the light emitter experiences a finger, and then successively passes through the display module and the light-transmissive regions and is projected onto the optical fingerprint sensor.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

REFERENCE SIGNS

Figure 1:
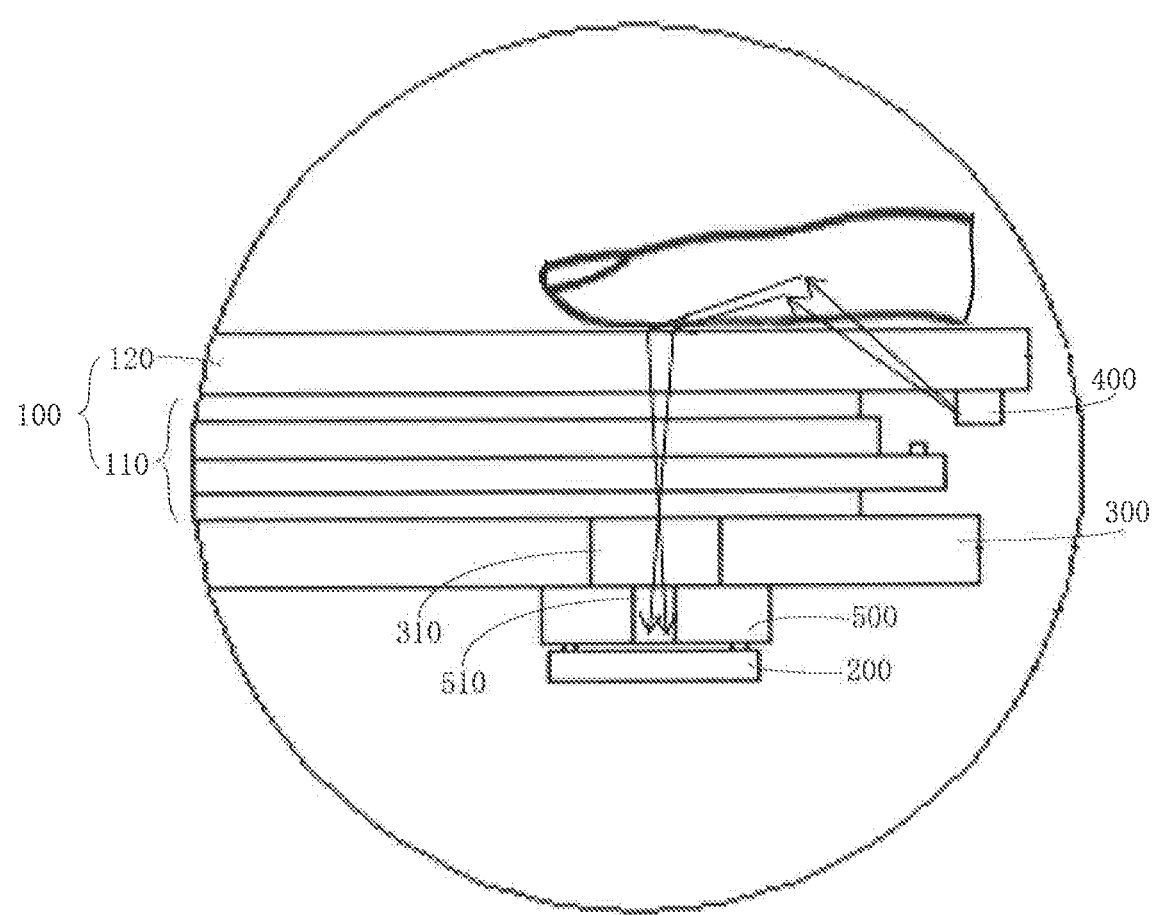
FIG. 1 is a schematic diagram of a partial structure of a terminal device disclosed in an embodiment of the disclosure.
Figure 2:
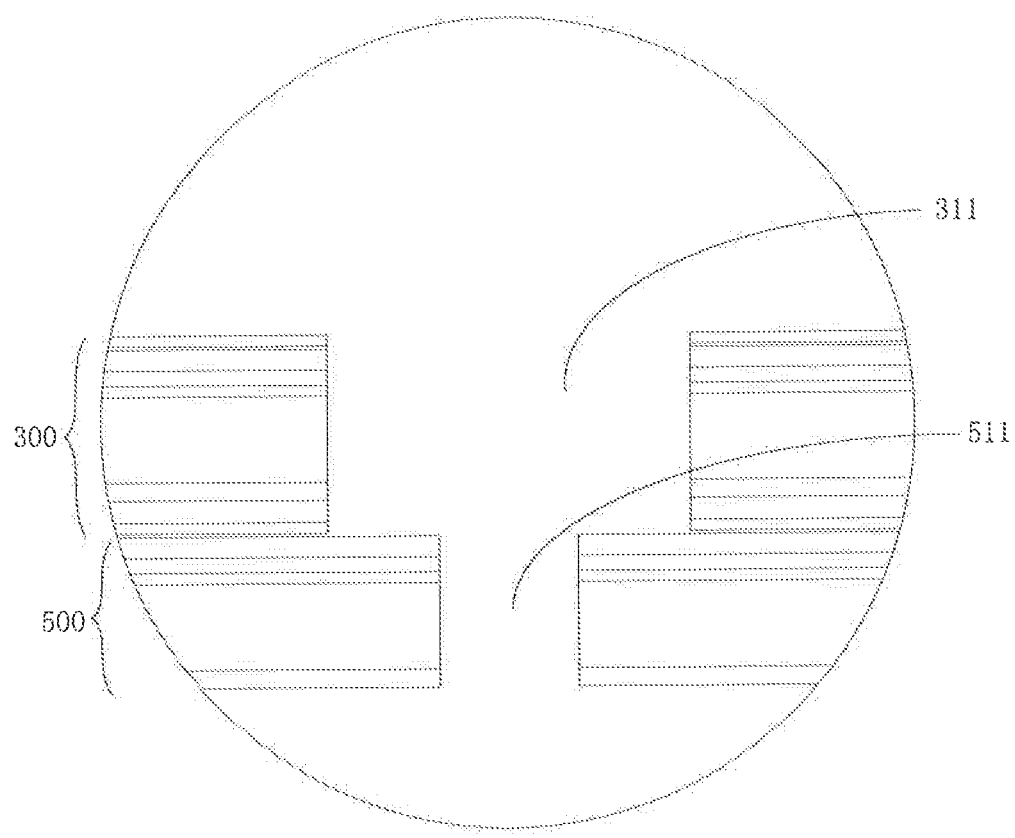
FIG. 2 is a schematic diagram of a specific partial structure of a terminal device disclosed in an embodiment of the disclosure.
Figure 3:
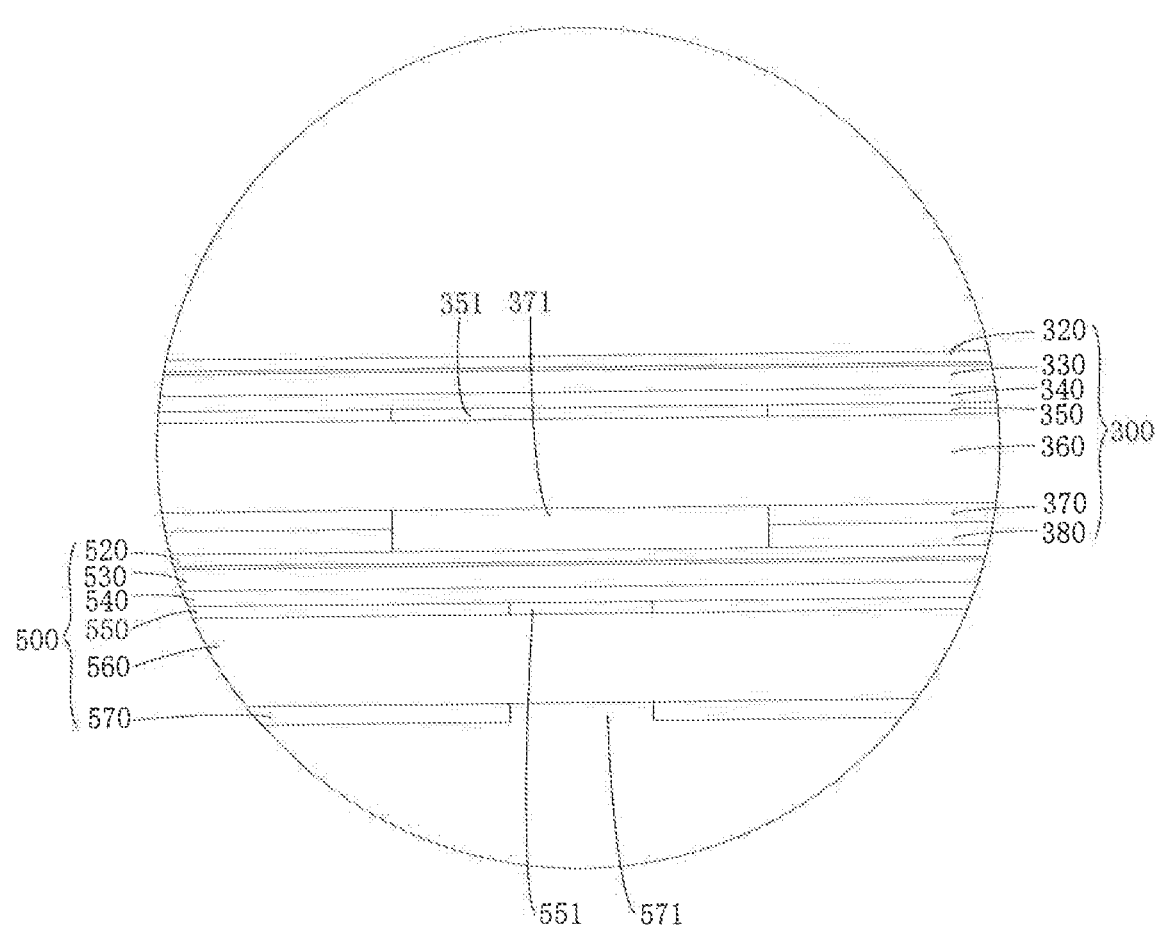
FIG. 3 is a schematic diagram of another specific partial structure of a terminal device disclosed in an embodiment of the disclosure.

100: display module; 110: display screen; 120: light-transmissive cover;
200: optical fingerprint sensor;
300: backlight assembly; 310: light-transmissive region; 311: light-transmissive hole; 320: light-shielding ring; 330: first light-enhancing film; 340: second light-enhancing film; 350: diffusion film; 351: first avoidance hole; 360: light guide plate; 370: reflective film; 371: second avoidance hole; 380: support frame;
400: light emitter;
500: backlight assembly; 510: light-transmissive region; 511: light-transmissive hole; 520: light-shielding ring; 530: first light-enhancing film; 540: second light-enhancing film; 550: diffusion film; 551: first avoidance hole; 560: light guide plate; 570: reflective film; 571: second avoidance hole;
a: film body; b: adhesive layer; c: prism structure surface.

Description of Embodiments

To make the objectives, technical solutions, and advantages of this disclosure clearer, the following clearly describes the technical solutions of this disclosure with reference to specific embodiments and corresponding accompanying drawings. Apparently, the described embodiments are merely some but not all of the embodiments of this disclosure. All other embodiments obtained by a person of ordinary skill in the art based on the embodiments of this disclosure shall fall within the protection scope of this disclosure.

The technical solutions provided in the embodiments of this disclosure are described in detail below with reference to the accompanying drawings.

Referring to FIG. 1 to FIG. 5, an embodiment of this disclosure discloses a terminal device. The disclosed terminal device includes a display module 100, an optical fingerprint sensor 200, at least two backlight assemblies 300, and a light emitter 400

The display module 100 is a display component of the terminal device. The display module 100 includes a display screen 110 and a light-transmissive cover 120. The light-transmissive cover 120 covers the display screen 110, and the light-transmissive cover 120 can play a role of protecting the display screen 110. Specifically, the light-transmissive cover 120 is fastened onto the display screen 110 through an optical adhesive layer. The light-transmissive cover 120 is made of a light-transmissive material, and displaying of the display screen 110 is not affected. For example, the light-transmissive cover 120 may be a glass cover or a transparent resin cover. A specific material of the light-transmissive cover 120 is not limited in this embodiment of this disclosure. Certainly, the light-transmissive cover 120 may also provide an installation location for the light emitter 400.

The light emitter 400 and the display screen 110 are both provided on an inner surface of the light-transmissive cover 120. Generally, the light-transmissive cover 120 has an extending edge, and the light emitter 400 is provided on an extending edge of the light-transmissive cover 120. The light emitter 400 is located on a side of the display screen 110. Specifically, the light emitter 400 may also be fastened onto the inner surface of the light-transmissive cover 120 in a bonding manner. In this embodiment, the light emitter 400 is used to emit light, and the light-transmissive cover 120 has a finger placement region. The light emitted by the light emitter 400 is able to pass through the light-transmissive cover 120 and be projected onto a finger placed on the finger placement region. The light penetrates skin of the finger and is reflected by phalange, and then transmitted back to the finger placement region through the skin of the finger. It should be noted that the inner surface of the light-transmissive cover 120 is a surface of the light-transmissive cover 120 facing towards an inner cavity of the terminal device, that is, a surface through which the light-transmissive cover 120 is connected to the display screen 110.

In this embodiment, the optical fingerprint sensor 200 is provided on a side of the display screen 110 facing away from the light-transmissive cover 120. The at least two backlight assemblies 300 are provided sequentially between the display screen 110 and the optical fingerprint sensor 200, and the backlight assemblies are configured to provide backlight. Along a direction from the display screen 110 to the optical fingerprint sensor 200, areas of the light-transmissive regions of the at least two backlight assemblies are gradually reduced.

The light transmitted from the skin of the finger to the finger placement region successively passes through the display module 100 and the light-transmissive regions, and then is projected onto the optical fingerprint sensor 200 for the optical fingerprint sensor 200 to recognize a fingerprint. As described above, the light emitted by the light emitter 400 is first transmitted to the phalange through the skin, and then under reflection of the phalange, is transmitted back through the skin of the finger. Due to presence of fingerprints on the finger, refraction of the light varies with a structure of the fingerprints during light transmission. Eventually, light capable of reflecting the shape of the fingerprints successively passes through the display module 100 and the light-transmissive regions, and then is sensed by the optical fingerprint sensor 200. A principle and process for sensing the fingerprints by the optical fingerprint sensor 200 are well-known technologies, and therefore are not described herein.

In a specific implementation, a distance between a projection of the light emitter 400 and a projection of the optical fingerprint sensor 200 in a direction perpendicular to the display screen 110 may be 5 mm to 15 mm. It is proved through tests that, with such distance range, a good light projection effect can be ensured for the light emitter 400 and a good fingerprint recognition effect can be implemented for the optical fingerprint sensor 200.

The light gradually converges in the process of successively passing through the display module 100 and the light-transmissive regions. In this embodiment, in the direction from the display screen 110 to the optical fingerprint sensor 200, the areas of the light-transmissive regions of the at least two backlight assemblies are gradually reduced, and the light can be finally projected onto the optical fingerprint sensor 200 after passing through the light-transmissive regions.

According to the terminal device disclosed in this embodiment of this disclosure, the areas of the light-transmissive regions of the backlight assemblies are gradually reduced; therefore, in two adjacent backlight assemblies, an area of a light-transmissive region of a backlight assembly closer to the display screen 110 is larger, so that more light can be projected in a direction towards the optical fingerprint sensor 200. In addition, the light gradually converges in a process of approaching the optical fingerprint sensor 200; therefore, in two adjacent backlight assemblies, an area of a light-transmissive region of a backlight assembly closer to the optical fingerprint sensor 200 is smaller. In this case, the backlight assembly with the smaller light-transmissive region can supplement backlight for the light-transmissive region of the backlight assembly with the larger light-transmissive region, thereby avoiding the problem of poor backlight effect resulting from a relatively large light-transmissive region.

As described above, there are at least two backlight assemblies. In a specific implementation, there may be two backlight assemblies. With the two backlight assemblies, a stacking height of the display module 100, the optical fingerprint sensor 200, and the backlight assemblies may not be excessively large, and a good backlight effect can also be implemented.

Referring to FIG. 1 to FIG. 5 again, the two backlight assemblies may include a backlight assembly 300 and a backlight assembly 500. The backlight assembly 300 and the backlight assembly 500 are sequentially disposed between the display screen 110 and the optical fingerprint sensor 200.

The backlight assembly 300 may be disposed on a side of the display screen 110 facing away from the light-transmissive cover 120, and the backlight assembly 300 provides backlight for the display module 100. The backlight assembly 300 has a light-transmissive region 310, and the light emitted by the light emitter 400 can pass through the display screen 110 and the light-transmissive region 310 after being reflected by the finger. The light cannot penetrate the backlight assembly 300 itself, and in this embodiment, the backlight assembly 300 is provided with the light-transmissive region 310, so that the light reflected by the finger can pass through the light-transmissive region 310.

In an optional solution, the light-transmissive region 310 may be a light-transmissive hole 311 that runs through the backlight assembly 300. With the light-transmissive hole 311 that is provided, the light reflected by the finger can enter the optical fingerprint sensor 200 more easily, and the light-transmissive hole 311 can reduce loss of light intensity during transmission of the light.

In general cases, the backlight assembly 300 may include a light-shielding ring 320, a first light-enhancing film 330, a second light-enhancing film 340, a diffusion film 350, a light guide plate 360, and a reflective film 370 that are sequentially arranged in a direction away from the display screen 110.

A region, corresponding to the light-transmissive region 310, of the diffusion film 350 is provided with a first avoidance hole 351, thereby preventing the diffusion film 350 from diffusing the light. A region, corresponding to the light-transmissive region 310, of the reflective film 370 is provided with a second avoidance hole 371, so as to prevent the reflective film 370 from reflecting the light. For regions, corresponding to the light-transmissive region 310, of the first light-enhancing film 330, the second light-enhancing film 340, and the light guide plate 360, outer surfaces of the regions facing towards the display screen 110 are all flat surfaces.

Figure 5:
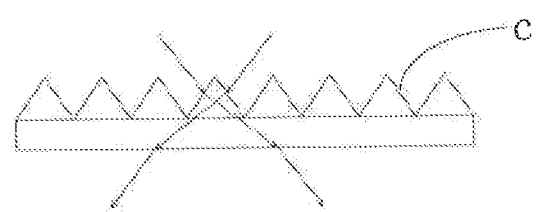
FIG. 5 is a schematic diagram of dispersion of light through a prism structure surface.

Outer surfaces of the first light-enhancing film 330, the second light-enhancing film 340, and the light guide plate 360 each are usually a prism structure surface c. As shown in FIG. 5, the prism structure surface c has a dispersion effect on light (as shown by the arrows in FIG. 5), and consequently the light is difficult to converge into the optical fingerprint sensor 200. Based on this, for the regions, corresponding to the light-transmissive region 310, of the first light-enhancing film 330, the second light-enhancing film 340, and the light guide plate 360, the outer surfaces of the regions facing towards the display screen 110 are designed to be flat surfaces, so as to avoid the light dispersion effect of these regions.

Figure 4:
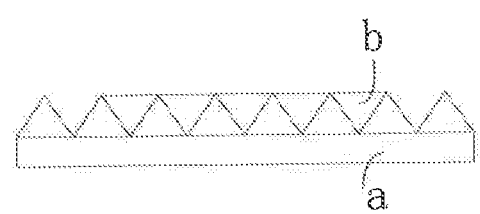
FIG. 4 is a schematic diagram of a specific structure of the partial structure in FIG. 3.

Designing partial outer surfaces of the first light-enhancing film 330, the second light-enhancing film 340, and the light guide plate 360 to be flat surfaces can be implemented in a variety of manners. Corresponding regions may be directly fabricated into flat surfaces in the manufacturing process. Certainly, the foregoing purpose can alternatively be implemented in other manners. Referring to FIG. 4, considering the difficulty of processing, in an optional implementation solution, the first light-enhancing film 330 and the second light-enhancing film 340 may each include a film body a and an adhesive layer b. A surface of the film body a facing towards the display screen 110 is a prism structure surface, and the adhesive layer b may be filled on the prism structure surface, and makes a part of the outer surface form a flat surface. In an optional implementation solution, a refractive index of the adhesive layer b can be equal to a refractive index of the film body a, thereby undoubtedly further reducing dispersion of the light in the transmission process.

In order to improve the stability of installation, in an optional implementation solution, a support frame 380 may be provided between the backlight assembly 300 and the backlight assembly 500. The support frame 380 is a frame structure and does not affect working of the backlight assembly 500 and the optical fingerprint sensor 200. Specifically, the support frame 380 may be a metal frame, such as an iron frame.

After passing through the light-transmissive cover 120 and the display screen 110, the reflected light passes through the light-transmissive region 310. In order to allow possibly more light to project onto the optical fingerprint sensor 200, the light-transmissive region 310 usually has a larger area.

In this embodiment, the backlight assembly 500 is disposed between the backlight assembly 300 and the optical fingerprint sensor 200. The backlight assembly 500 has a light-transmissive region 510. A projection of the light-transmissive region 510 in a light-sensing direction of the optical fingerprint sensor 200 is located inside the light-transmissive region 310, and the light passing through the light-transmissive region 310 can be projected onto the optical fingerprint sensor 200 after passing through the light-transmissive region 510. The backlight assembly 500 is mainly used to supplement backlight for the light-transmissive region 310. Because the light gradually converges in the process of approaching the optical fingerprint sensor 200, the light-transmissive region 510 does not need to have a large area, and the area of the light-transmissive region 510 is smaller than the area of the light-transmissive region 310.

Similarly, the light-transmissive region 510 may be a light-transmissive hole 511 that runs through the backlight assembly 500. With the light-transmissive hole 511, the light reflected by the finger can undoubtedly enter the optical fingerprint sensor 200 more easily, and the light-transmissive hole 511 can reduce loss of light intensity during transmission of the light.

In general cases, the backlight assembly 500 may include a light-shielding ring 520, a first light-enhancing film 530, a second light-enhancing film 540, a diffusion film 550, a light guide plate 560, and a reflective film 570 that are sequentially arranged between the backlight assembly 300 and the optical fingerprint sensor 200. A region, corresponding to the light-transmissive region 510, of the diffusion film 550 is provided with a first avoidance hole 551, thereby preventing the diffusion film 550 from diffusing the light. A region, corresponding to the light-transmissive region 510, of the reflective film 570 is provided with a second avoidance hole 571, so as to prevent the reflective film 570 from reflecting the light. For regions, corresponding to the light-transmissive region 510, of the first light-enhancing film 530, the second light-enhancing film 540, and the light guide plate 560, outer surfaces of the regions facing towards the display screen 110 are all flat surfaces.

Similar to the structures of the first light-enhancing film 330, the second light-enhancing film 340, and the light guide plate 360 described above, the outer surfaces of the first light-enhancing film 530, the second light-enhancing film 540, and the light guide plate 560 are usually prism structure surfaces. The prism structure surfaces have a dispersion effect on the light, and consequently the light is difficult to converge into the optical fingerprint sensor 200. Based on this, in an optional implementation solution, for the regions, corresponding to the light-transmissive region 510, of the first light-enhancing film 530, the second light-enhancing film 540, and the light guide plate 560, the outer surfaces of the regions facing towards the display screen 110 are designed to be flat surfaces, so as to avoid the light dispersion effect of these regions.

Designing partial outer surfaces of the first light-enhancing film 530, the second light-enhancing film 540, and the light guide plate 560 to be flat surfaces can be implemented in a variety of manners. The corresponding regions may be directly fabricated into flat surfaces in the manufacturing process. Certainly, the foregoing purpose can alternatively be implemented in other manners. Referring to FIG. 4, considering the difficulty of processing, in an optional implementation solution, the first light-enhancing film 530 and the second light-enhancing film 540 may each include a film body a and an adhesive layer b. A surface of the film body a facing towards the display screen 110 is a prism structure surface, and the adhesive layer b may be filled on the prism structure surface, and makes a part of the outer surface form a flat surface. Certainly, a refractive index of the adhesive layer b is equal to a refractive index of the film body a. Certainly, the thickness of the light guide plate 560 is relatively large, and it is easier to process the outer surface of the region, corresponding to the light-transmissive region 510, of the light guide plate 560 into a flat surface in the processing process.

In the terminal device disclosed in this embodiment of this disclosure, the display screen 110 may be a TFT display screen, or may be another display screen that needs to be equipped with a backlight assembly. A specific type of the display screen is not limited in this embodiment of this disclosure.

The terminal device disclosed in this embodiment of this disclosure may be a device such as a smart phone, a tablet computer, an e-book reader, a wearable device (such as a smart watch), or a game console. A specific type of the terminal device is not limited in this embodiment of this disclosure.

The foregoing embodiments of this disclosure focus on differences between the embodiments. Provided that different optimized features between the embodiments are not contradictory, the embodiments may be combined to form a preferred embodiment. Considering conciseness of the text, details are not described herein.

The foregoing descriptions are only the embodiments of this disclosure, and are not intended to limit this disclosure. For those skilled in the art, this disclosure can have various modifications and changes. Any modification, equivalent replacement, and improvement made without departing from the spirit and principle of this disclosure shall fall within the protection scope of the claims of this disclosure.

What is claimed is:

1. A terminal device, comprising a display module, an optical fingerprint sensor, at least two backlight assemblies, and a light emitter, wherein the display module comprises a display screen and a light-transmissive cover that covers the display screen; the light emitter and the display screen are both fastened onto an inner surface of the light-transmissive cover, the optical fingerprint sensor is provided on a side of the display screen facing away from the light-transmissive cover, and the at least two backlight assemblies are provided sequentially between the display screen and the optical fingerprint sensor along a direction from the display screen to the optical fingerprint sensor, areas of light-transmissive regions of the at least two backlight assemblies are gradually reduced; and light emitted by the light emitter experiences a finger, and then successively passes through the display module and the light-transmissive regions and is projected onto the optical fingerprint sensor,
wherein the backlight assembly comprises a light-shielding ring, a first light-enhancing film, a second light-enhancing film, a diffusion film, a light guide plate, and a reflective film that are sequentially arranged in a direction away from the display screen: a region, corresponding to the light-transmissive region, of the diffusion film is provided with a first avoidance hole, and a region, corresponding to the light-transmissive region, of the reflective film is provided with a second avoidance hole; and for regions, corresponding to the light-transmissive region, of the first light-enhancing film, the second light-enhancing film, and the light guide plate, outer surfaces of the regions facing towards the display screen are all flat surfaces.

2. The terminal device according to claim 1, wherein the light-transmissive region is a light-transmissive hole that runs through the backlight assembly in a thickness direction of the backlight assembly.

3. The terminal device according to claim 1, wherein the first light-enhancing film and the second light-enhancing film both comprise a film body and an adhesive layer, a surface of the film body facing towards the display screen is a prism structure surface, and the adhesive layer is applied on the prism structure surface to form the outer surface.

4. The terminal device according to claim 3, wherein a refractive index of the adhesive layer is equal to a refractive index of the film body.

5. The terminal device according to claim 1, wherein two such backlight assemblies are provided.

6. The terminal device according to claim 5, wherein a support frame is provided between the two backlight assemblies.

7. The terminal device according to claim 1, wherein a distance between a projection of the light emitter and a projection of the optical fingerprint sensor in a direction perpendicular to the display screen is 5 mm to 15 mm.

8. The terminal device according to claim 1, wherein the display screen is a TFT display screen.

9. The terminal device according to claim 1, wherein the terminal device is a mobile phone, a tablet computer, an e-book reader, a smart watch, or a game console.

10. The terminal device according to claim 2, wherein the backlight assembly comprises a light-shielding ring, a first light-enhancing film, a second light-enhancing film, a diffusion film, a light guide plate, and a reflective film that are sequentially arranged in a direction away from the display screen; a region, corresponding to the light-transmissive region, of the diffusion film is provided with a first avoidance hole, and a region, corresponding to the light-transmissive region, of the reflective film is provided with a second avoidance hole; and for regions, corresponding to the light-transmissive region, of the first light-enhancing film, the second light-enhancing film, and the light guide plate, outer surfaces of the regions facing towards the display screen are all flat surfaces.

11. The terminal device according to claim 2, wherein two such backlight assemblies are provided.

12. The terminal device according to claim 2, wherein a distance between a projection of the light emitter and a projection of the optical fingerprint sensor in a direction perpendicular to the display screen is 5 mm to 15 min.

13. The terminal device according to claim 2, wherein the display screen is a TFT display screen.

14. The terminal device according to claim 2, wherein the terminal device is a mobile phone, a tablet computer, an e-hook reader, a smart watch, or a game console.

15. The terminal device according to claim 1, wherein two such backlight assemblies are provided.

16. The terminal device according to claim 1, wherein a distance between a projection of the light emitter and a projection of the optical fingerprint sensor in a direction perpendicular to the display screen is 5 mm to 15 mm.

17. The terminal device according to claim 1, wherein the display screen is a TFT display screen.

18. The terminal device according to claim 1, wherein the terminal device is a mobile phone, a tablet computer, an e-book reader, a smart watch, or a game console.

19. A terminal device, comprising a display module, an optical fingerprint sensor, at least two backlight assemblies, and a light emitter, wherein the display module comprises a display screen and a light-transmissive cover that covers the display screen; the light emitter and the display screen are both fastened onto an inner surface of the light-transmissive cover, the optical fingerprint sensor is provided on a side of the display screen facing away from the light-transmissive cover, and the at least two backlight assemblies are provided sequentially between the display screen and the optical fingerprint sensor; along a direction from the display screen to the optical fingerprint sensor, areas of light-transmissive regions of the at least two backlight assemblies are step-like; and light emitted by the light emitter experiences a finger, and then successively passes through the display module and the light-transmissive regions and is projected onto the optical fingerprint sensor,
wherein the backlight assembly comprises a light-shielding ring, a first light-enhancing film, a second light-enhancing film, a diffusion film, a light guide plate, and a reflective film that are sequentially arranged in a direction away from the display screen; a region, corresponding to the light-transmissive region, of the diffusion film is provided with a first avoidance hole, and a region, corresponding to the light-transmissive region, of the reflective film is provided with a second avoidance hole; and for regions, corresponding to the light-transmissive region, of the first light-enhancing film, the second light-enhancing film, and the light guide plate, outer surfaces of the regions facing towards the display screen are all flat surfaces.

* * * * *